(12) United States Patent
Nikitin

(10) Patent No.: US 7,427,756 B2
(45) Date of Patent: Sep. 23, 2008

(54) METHOD OF PRECISION MEASUREMENTS OF SIZES AND LINE WIDTH ROUGHNESS OF SMALL OBJECTS IN ACCORDANCE WITH THEIR IMAGES OBTAINED IN SCANNING ELECTRON MICROSCOPE

(75) Inventor: Arkady Nikitin, Ardsley, NY (US)

(73) Assignee: General Phosphorix, LLC, Ardsley, NY (US)

( * ) Notice: Subject to any disclaimer, the term of this patent is extended or adjusted under 35 U.S.C. 154(b) by 212 days.

(21) Appl. No.: 11/244,357

(22) Filed: Oct. 6, 2005

(65) Prior Publication Data

US 2007/0081727 A1    Apr. 12, 2007

(51) Int. Cl.
*G01N 23/00*    (2006.01)

(52) U.S. Cl. ................. 250/307; 250/306; 250/311; 250/310

(58) Field of Classification Search ....... 250/306–443.1
See application file for complete search history.

(56) References Cited

U.S. PATENT DOCUMENTS 4,670,652 A * 6/1987 Ichihashi et al. ............ 250/310

* cited by examiner

*Primary Examiner*—Jack I. Berman
*Assistant Examiner*—Andrew Smyth

(57) ABSTRACT

A novel method of precision measurements of sizes and line width roughness of small objects in accordance with their images obtained in scanning electron microscope, which is improvement of the existing methods and which realizes the new strategy of the measurements. This method has a higher stability with respect to noises of the video signal.

6 Claims, 3 Drawing Sheets

Dependence of the R-Factor upon Linewidth.
1 is a case of perfect model and noise equal to zero;
2 is a case of rough model and presence of noise.

Shape of the maximum of computer-simulation videosignal.

Shape of the maximum of experimental videosignal

Dependence of the R-Factor upon Linewidth.
1 is a case of perfect model and noise equal to zero;
2 is a case of rough model and presence of noise.

METHOD OF PRECISION MEASUREMENTS OF SIZES AND LINE WIDTH ROUGHNESS OF SMALL OBJECTS IN ACCORDANCE WITH THEIR IMAGES OBTAINED IN SCANNING ELECTRON MICROSCOPE

BACKGROUND OF THE INVENTION

The present invention relates to a method of precision measurements of sizes and line width roughness of small objects in accordance with their images obtained in scanning electron microscope.

Since size of any object is a distance between its edges, therefore in accordance with an accepted statement a problem of localization of edges of the measuring object is a main problem of a size metrology as a whole. As stated in M. Postek "Critical Issues in Scanning Electron Microscope Metrology"//Journ. of Research of the Nat. Inst. of Standards and Technol., Vol. 99, No. 5, 1994, p. 656. "without an ability to know with certainty the location of the edges, measurement accuracy can not be claimed"

During measurement of objects of small sizes, such as elements of integrated circuits, scanning electron microscopes are widely utilized. In this case it is necessary to solve the problem of localization of an edge of an object on its SEM image. This problem in the present time is not solved.

The existence of mathematical models of processes for forming a video signal in SEM opens new possibilities of localization of an edge and, correspondingly, of measurements of microsizes. Several models are disclosed in corresponding literature, which allow imitation of the SEM video signal with a varying accuracy. The accepted approach to the use of mathematical models in metrology can be explained as follows:

Let is assume that there is a model which allows to imitate the video signal in SEM accurately. Then, it is possible to replace the experimental video signal Se(x) obtained in SEM from the measuring object, with a model video signal Sm(x) without losses or distorted information contained in Se(x). The meaning of this replacement is that on the signal Se(x) a position of the edge of the object is not known, while on Sm(x) it is known, since this value was given as a parameter during calculations of the video signal Sm(x) coinciding Se(x).

Models which are widely used are those that are based on a calculation of trajectories of the separate electrons in a solid body in accordance with the method of Monte Carlo as disclosed in J. Lowney, M. Postek, and A. Vladar. "A Monte-Carlo model for SEM linewidth metrology".//SPIE Proc., 2196, 1994, pp. 85-96. In J. Villarubia, A. Vladar, J. Lowney, and M. Postek. "Scanning electron microscope analog of scatterometry"//Proc. of SPIE, Vol. 4689, 2002, p. 306. Approaches described in accordance with the opinion of their authors are capable of solving the problems of measurements of microsizes. These approaches are however not free from disadvantages and limitations. Some of them are as follows:

Achievement of acceptable statistic accuracy of the results requires great calculating resources, and the time spent for calculations is significant. A typical time for the calculation of the shape of one edge is several hours. Therefore a possibility of wide varying of the parameters of a model is limited. The authors see the solution that, preliminarily, a "library" of variants is to be calculated from which when necessary it is possible to select needed variants for comparison then with the experimental video signals. If the number of the parameters of the model is N, then for each of them, for example for a size, 10 different values are calculated and the total number of library variants is $10^N$. The number of parameters of the model can reach 7-8, so that the total number of "cards" in a card system of such a library can be tens of millions. The library with such a capacity is very difficult to create and it is more difficult to use it. The dividing of the range of sizes, for example into two parts, can not provide an accuracy of determination of the sizes which are necessary for the modern technology. A more detailed division would lead to a significant increase of the value of the library which is already very high.

There is another approach to modeling of the video signal in SEM, which don't use the method of Monte Carlo. The video signal in this case is calculated based on analytical (algebraic) expressions which are based on tested laws of interaction of electrons with a solid body, generation of secondary electrons, and their absorption in a thickness of the object and exiting through a shaped surface as disclosed for example in R. Ammossov, V. Dgeleznov, A. Nikitin, "Forming of the SEM image from trench with vertical sidewalls".// Electronnaja Technika, ser. Mikroelektronika, vyp. 3(115), 1985, pp. 16-23. (In Russian), R. Ammossov, V. Dgeleznov, A. Nikitin. "Analys of the SEM-images of a ledge with inclined sidewalls".//Electronnaja Technika, ser. Mikroelektronika, vyp. 3(119), 1986, pp. 17-21. (In Russian). For calculation of a model video signal in these cases it is not necessary to carry out excessive calculation resources, and the time for calculation of a signal variant corresponds to milliseconds. Therefore it is possible to get rid of libraries and to carry out a comparison of experimental and model video signals directly during the process of performing measurements, with execution of several clarifying interpolations. As a result, it is possible to achieve a high accuracy of measurement. Adequacies of the model signals to experimental signals can be evaluated by a comparison of FIGS. 1a and 1b.

SUMMARY OF THE INVENTION

Accordingly, it is an object of the present invention to provide a method of precision measurements of sizes and line width roughness of small objects in accordance with their images obtained in scanning electron microscope, which is improvement of the existing methods and which realizes the above mentioned strategy of the measurements.

In keeping with these objects and with others which will become apparent hereinafter, one feature of the present invention resides, briefly stated, a method of measurement of microsizes of relief objects in scanning electron microscope with use of analytical models, comprising the steps of:

1.1 storing an SEM image of a measurement object on a carrier or a memory of a computer in digital form for subsequent processing;

1.2 selecting from the stored image which represents a dependency of a value of a video signal S from coordinates x and y in a field of view of the microscope—S(s, y), a signal line representing a dependency of the video signal S from the coordinate S with a constant value of y—S(x) which is an experimental video signal $S_E(x)$;

1.3 determining a number of parameters of an analytical model which represents a system of equations, substantially fully characterizing a geometry of the relief object, its composition and characteristic of the measuring SEM;

1.4 assigning to each of the parameters a credible numerical value selected with consideration of a preliminary information about an object and the microscope, the set of such values is an initial approximation;

1.5 with the use of said equations of analytical model and the initial approximation, calculating a model video signal of an initial approximation $S^{(0)}(x)$, which imitates the experimental video signal $S_E(x)$;

1.6 with the calculated video signal $S^{(0)}(x)$ bringing the calculated video signal $S^{(0)}(x)$ in the correspondence with the scale experimental video signal $S_{(E)}(x)$ by scaling and selection of a background level so as to obtain a normalized video signal;

1.7 comparing the normalized video signal with the experimental video signal in and fixing a degree of a mutual correspondence;

1.8 introducing into initial numerical value of a size $L_0$ a perturbance $\delta L_0$ so that a new value of the size $L_1$ is equal to $L_1 = L_0 + \delta L_0$, value of $\delta L_0$ can be arbitrary, but for robustness of calculations it should be small, less then 5-10% of $L_0$;

1.9 calculating a first perturbed model video signal $S^{(1)}(x)$ and bringing it into correspondence with experimental video signal in accordance with 1.6 and also comparing it with experimental video signal $S_E(x)$ in accordance with 1.7;

1.10 if the video signal $S^{(1)}(x)$ better corresponds to the experimental video signal $S_E(x)$ than $S^{(0)}(x)$ obtained in 1.7 then selecting a new perturbance of the size $\delta L_1$ with the same sign as $\delta L_0$, and otherwise selecting a sign $\delta L_1$ opposite to the sign $\delta L_0$;

1.11 introducing into the value $L_1$ a new disturbance $\delta L_1$ with consideration of said sign rule formulated in 1.10 and repeating the steps 1.8-1.10;

1.12 varying the value L, selecting a value which provides a best correspondence model-video signal to the experimental video signal so that said value of the model object is an actual model physical object measured in correspondence with the direction x in SEM image;

1.13 repeating the steps 1.1-1.12 for all other lines of the stored SEM image so as to obtain information which allows to make a judgment about changes of sizes of objects along a direction y, and also about its shape and details of a perimeter and also allowing to determine an average value of a size of an object and its dispersion which statistically characterizes a non-homogeneity of the width of the object or a line width roughness.

When the method is performed in accordance with the present invention, it eliminates the disadvantages of the prior art and is highly advantageous.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
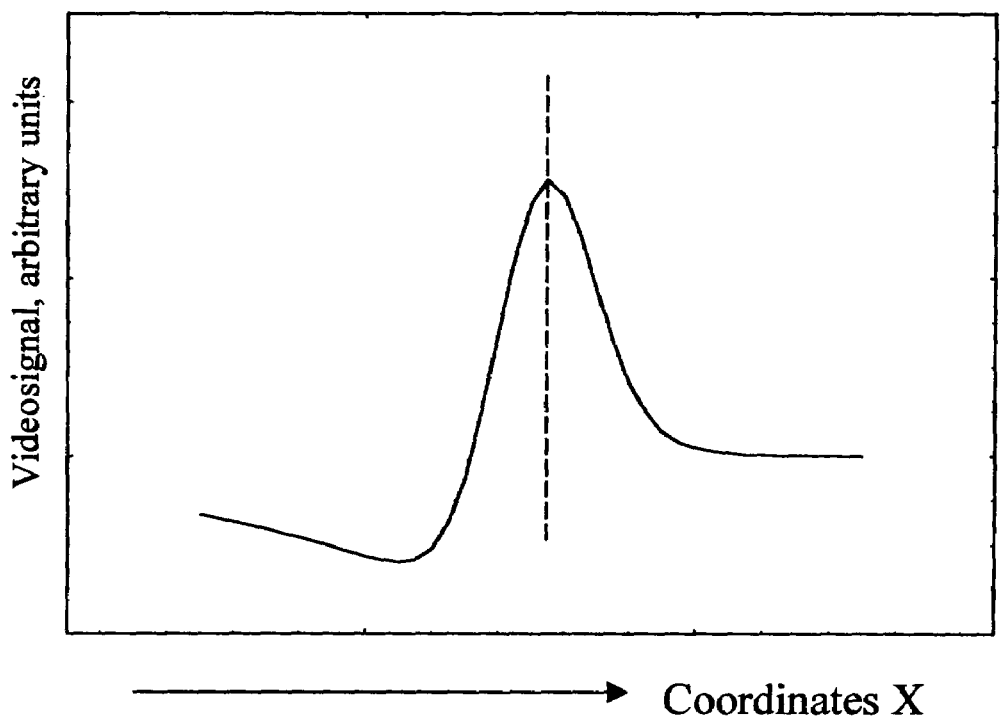
FIG. 1*a* is a view showing a shape of a maximum of a computer-simulation video signal.
Figure 1B:
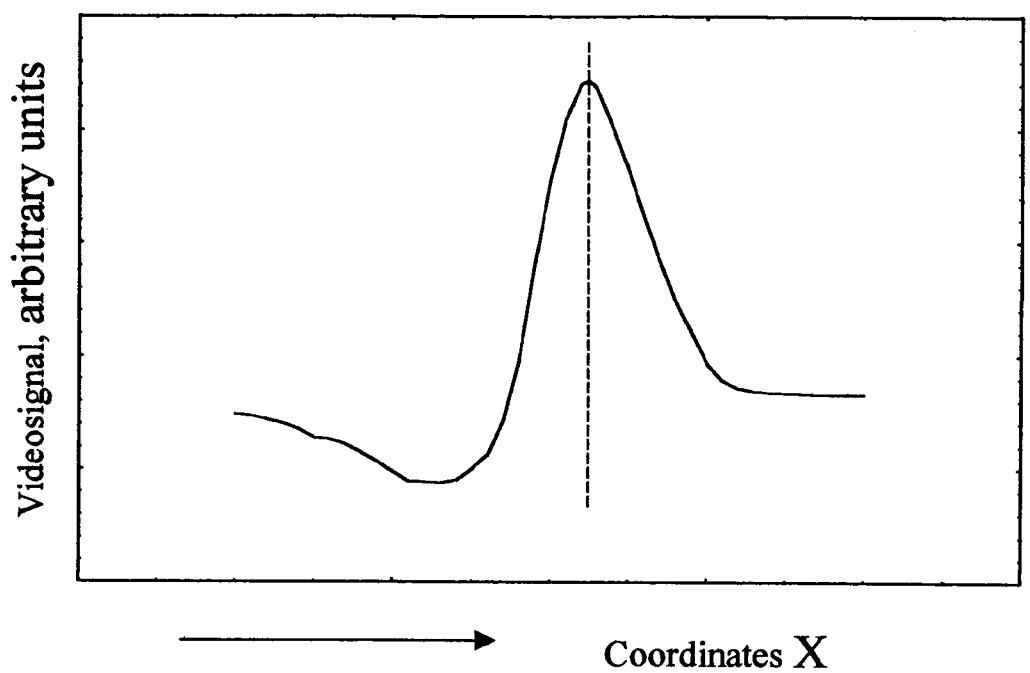
FIG. 1*b* is a view showing a shape of a maximum experimental video signal.
Figure 2:
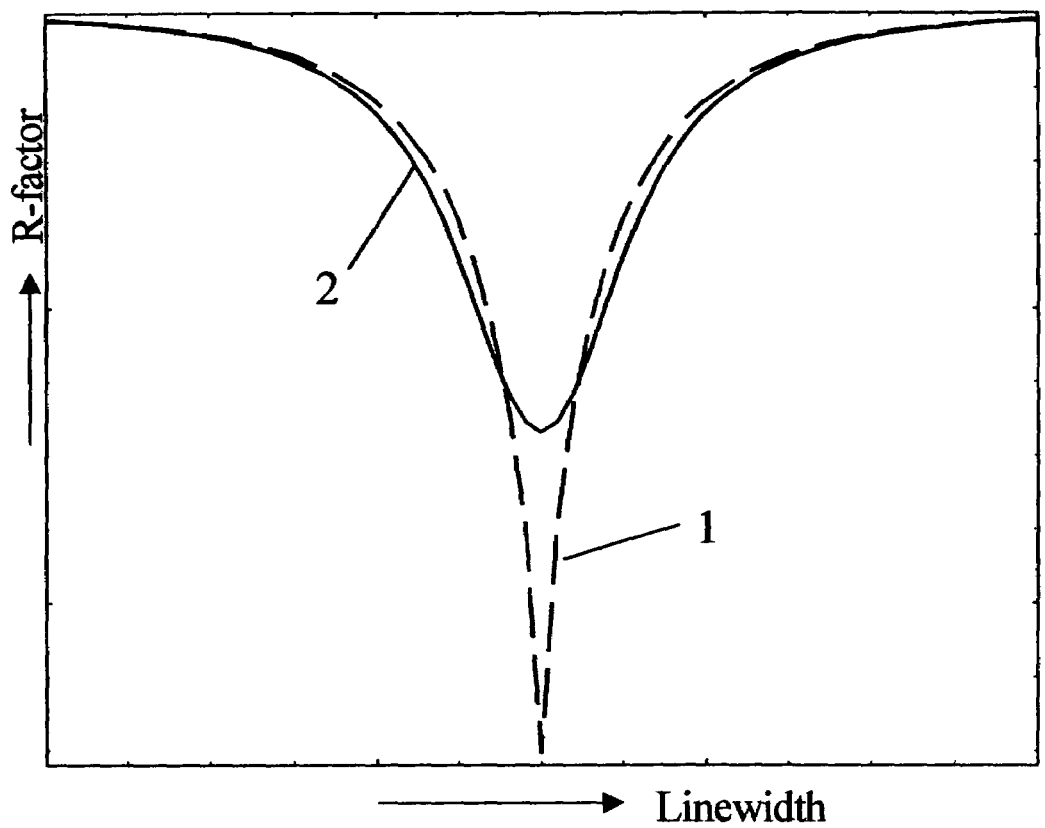
FIG. 2 is a view showing a dependence of R-factor upon linewidth.

In accordance with the present invention a method of measurement of microsizes of relief objects is provided in a scanning electron microscope with the use of analytical models.

First an SEM image of a measurement object is stored on a carrier or a memory of a computer in digital form for subsequent processing. From the stored image which represents a dependency of a value of a video signal S from coordinates x and y in a field of view of the microscope—$S(s,y)$, a signal line is selected representing a dependency of the video signal S from the coordinate x with a constant value of y—$S(x)$ which is an experimental video signal $S_E(x)$. A number of parameters of an analytical model is determined, which represents a system of equations, substantially fully characterizing a geometry of the relief object, its composition, and characteristic of the measuring SEM.

Then, assigning to each of the parameters a credible numerical value selected with consideration of a preliminary information about an object and the microscope is performed.

With the use of said equations of analytical model and an additional approximation, a model video signal of an initial approximation $S^{(0)}(x)$ is calculated, which imitates the experimental video signal $S_E(x)$. Calculated video signal $S^{(0)}(x)$ is brought in the correspondence with the scale experimental video signal $S_{(E)}(x)$ by scaling and selection of a background level so as to obtain a normalized video signal. The normalized video signal is compared with the experimental video signal and fixing a degree of a mutual correspondence;

A disturbance $\delta L_0$ is introduced into initial numerical value of a size $L_0$ so that a new value of the size $L_1$ is equal to $L_1 = L_0 + \delta L_0$. Then a first perturbed model video signal $S^{(1)}(x)$ is selected and brought into correspondence with experimental video signal $S_E(x)$, and also compared with experimental video signal $S_E(x)$. If the video signal $S^{(1)}(x)$ better corresponds to the experimental video signal $S_E(x)$ than $S^{(0)}(x)$, then a new perturbance of the size $\delta L_1$ is selected with the same sign as $\delta L_0$, and otherwise a sign $\delta L_1$ opposite to the sign $\delta L_0$ is selected.

A new disturbance $\delta L_1$ is introduced to the value L with consideration of the signs above and the previous steps are repeated. The value L, is varied, and a value is selected which provides a best correspondence model video signal to the experimental video signal so that said value L of the model object is an actual model physical object measured in correspondence with the direction x in SEM image.

The preceding steps are repeated for all other lines of the stored SEM image so as to obtain information which allows to make a judgment about changes of sizes of objects along a direction y, and also about its shape and details of a parameter and also allowing to determine an average value of a size of an object and its dispersion which statistically characterizes a non homogeneity of the width of the object or a line width roughness.

In the inventive method the parameters of the analytical model are selected from the group consisting of a size of the object on a plane L, its height h, sidewall angles, coefficient of secondary electron emission of a material of an element and a filed which surrounds it for heterogenic objects, and a resolution of the microscope.

A quantitative criterion of the correspondence can be a criterion selected from the group consisting of a coefficient of correlation, a factor of non-correspondence R and another numerical indicator.

A value of perturbance can be selected small which does not exceed 5-10% of $L_0$.

Clarification of the initial approximation can be performed with a use of method of least squares. In particular, the clarification of the initial approximation can be performed with a method of least squares in two steps including a first step for clarifying parameters which determine a shape of the maximums of the video signal, and a second step including clarification of the size object in conditions when a shape of the maximum of a model video signal corresponds the most to the shape of the maximums of the experimental video signal.

The method in accordance with the present invention can be demonstrated on the following examples.

Let us assume that it is necessary to measure a size L of a silicon projection which is formed on a silicone substrate. From a preliminary information about the object and the microscope it is known that its size L is within a range of 50-75 nanometers, a height of relief h is about 200 nanometers, and side walls are vertical, while a resolution of a measuring SEM σ is approximately 5 nanometers. The proposed list of parameters of this case completely describes an object in a microscope. SEM-image of the object which is obtained by standard method is considered stored in a memory of the computer as a two-dimensional set of numbers which reflect a dependency of a value of the video signal S from a number of pixel i in a line along an axis x, or a number j of the line along an axis y of the image: S(i,j). From the two-dimensional array S(i,j) one line S(i), is selected with a constant value j, and it is designated as an experimental video signal $S_E(i)$, while a number of dots of points of measurement of the video signal along the line (pixel) is designed as N. Conventionally N can reach several hundreds or thousands.

Calculations of a model video signal $S_M$ in the same i points (pixels) are not complicated to carry out, if one uses equations of an analytical model, for example as disclosed in R. Ammossov, V. Dgeleznov, A. Nikitin, "Forming of the SEM image from trench with vertical sidewalls".//Electronnaja Technika, ser. Mikroelektronika, vyp. 3(115), 1985, pp. 16-23. (In Russian), R. Ammossov, V. Dgeleznov, A. Nikitin. "Analys of the SEM-images of a ledge with inclined sidewalls".//Electronnaja Technika, ser. Mikroelektronika, vyp. 3(119), 1986, pp. 17-21. (In Russian), and these equations are introduced into parameters of initial approximation.

It is frequently more convenient, fast and more accurate to carry out clarification of all parameters of the model simultaneously with the use of a method of least squares. The procedure is explained herein below. First, a functional (of the following type is presented $$\Phi = \sum_{i=1}^{N} [S_M(i) - S_E(i)]^2$$

A value of this functional is less when a correspondence of the model and experimental video signals is better. In order to determine a minimum of this functional it is differentiated in accordance with the parameters L, h σ, and its derivatives are equated with zero. Equations are obtained as a result:

$$\frac{\partial \Phi}{\partial L} = \sum_{i=1}^{N} [S_M(i) - S_E(i)] \frac{\partial S_M}{\partial L} = 0 \quad (1)$$

$$\frac{\partial \Phi}{\partial h} = \sum_{i=1}^{N} [S_M(i) - S_E(i)] \frac{\partial S_M}{\partial h} = 0 \quad (2)$$

$$\frac{\partial \Phi}{\partial \sigma} = \sum_{i=1}^{N} [S_M(i) - S_E(i)] \frac{\partial S_M}{\partial \sigma} = 0 \quad (3)$$

In these equations $S_M(i)$ is distributed into Taylor row, and two first members of the row are selected in accordance with each parameter. The first of these equations is as follows:

$$\frac{\partial \Phi}{\partial L} = 0 = \sum \left\{ S^{(0)}(i) + \frac{\partial S}{\partial L} \Delta L + \frac{\partial S}{\partial h} \Delta h + \frac{\partial S}{\partial \sigma} \Delta \sigma - S_E(i) \right\} \frac{\partial S}{\partial L} \quad (1a)$$

For shortening of the process, constant limits of summation and indexes for derivatives are omitted. $S^{(0)}(i)$ is a model video signal which is calculated for the initial approximations. The values ΔL, Δh, and Δσ are corrections for the initial approximation of the parameters. After the transformation the equation 1a obtains the following form:

$$\sum \left(\frac{\partial S}{\partial L}\right)^2 \Delta L + \sum \frac{\partial S}{\partial L} \frac{\partial S}{\partial h} \Delta h + \sum \frac{\partial S}{\partial L} \frac{\partial S}{\partial \sigma} \Delta \sigma = \quad (1B)$$

$$\sum [S_E(i) - S^{(0)}(i)] \frac{\partial S}{\partial L}$$

Analogously to this, equations (2a) and (3a) are rewritten as follows:

$$\sum \frac{\partial S}{\partial h} \frac{\partial S}{\partial L} \Delta L + \sum \left(\frac{\partial S}{\partial h}\right)^2 \Delta h + \sum \frac{\partial S}{\partial h} \frac{\partial S}{\partial \sigma} \Delta \sigma = \quad (2B)$$

$$\sum [S_E(i) - S^{(0)}(i)] \frac{\partial S}{\partial h}$$

$$\sum \frac{\partial S}{\partial \sigma} \frac{\partial S}{\partial L} \Delta L + \sum \frac{\partial S}{\partial \sigma} \frac{\partial S}{\partial h} \Delta h + \sum \frac{\partial S}{\partial \sigma} \frac{\partial S}{\partial L} \Delta \sigma = \quad (3B)$$

$$\sum [S_E(i) - S^{(0)}(i)] \frac{\partial S}{\partial \sigma}$$

Specific derivatives for each i-th pixel in a line are calculated in finite differences. For example, the value ∂S/∂L for a pixel with the number I is calculated in accordance with the formula:

$$\frac{\partial S}{\partial L}(i) = \frac{S^{\oplus}(i) - S^{(0)}(i)}{\delta L^0}.$$

Here $S^{\oplus}$ (I) is a "perturbed" value of the model video signal for the pixel with number I.

Three equations (1B), (2B), (3B) form a system of linear equations with three unknown ΔL, Δh and Δσ. Its solution is not difficult. Corrected values of the size L, height of relief h and resolution of microscope δ are obtained by summation of the values of these parameters from the initial approximation and corrections:

$$L=L_0+\Delta L; \; h=h_0+\Delta h; \; \sigma=\sigma_0+\Delta\sigma.$$

If the accuracy of the results obtained in this manner is insufficient, then it is possible to repeat the procedure of clarifications by selecting as an initial approximation—the values of parameters obtained during a preceding step.

In order to additionally increase the accuracy of calculations of sizes it is possible to perform clarification of the initial approximation in two steps: in the first step a clarification of the parameters is performed which determines a shape of maximums of video signal. In the described example it is a height of a ledge h and a resolution of measuring SEM σ. During the second step a size of the object is clarified in conditions when the shape of the maximums of the model video signal more accurately corresponds to the shape of the maximums of the experimental video signal. Again the accuracy of the size L is obtained in this case since a dependency of the factor of non correspondence (R-factor) from the size L is expressed with a steeper curve (see FIG. 3), which has a sharper and deeper minimum, that allows to localize this minimum more accurately and thereby to determine the value of the size L more accurately.

The new method has a higher stability with respect to noises of the video signal. The reason is that in the calculations of corrections a significant number of individual values of video signals is involved: hundreds and thousands, and the influence of noises on the results is reduced in accordance with a square root from the number of the used values of the video signal. If the analytical model describes the shape of the video signal accurately, and noises of video signals are negligably small, then the model video signal which is calculated with the use of the clarified values of the parameters will be different from the experimental insignificantly, and the factor of its non correspondence (R-factor) will have a tendency to zero. If the model can not be considered perfect, and a real video signal contains noises with a finite value, then R-factor even with accurate values of the parameters will be different from zero. This however can not be a problem in searching for its minimal value which is not equal to zero. There are no limitations in principle for the number of parameters of the model.

The area of application of the method can be expanded for measurements of more complicated objects, such as multi-layer relief structures, objects with rounded corners, etc. It is necessary for this to carry out only a partial development of an analytical models and expansion of a list of parameters.

It will be understood that each of the elements described above, or two or more together, may also find a useful application in other types of constructions differing from the types described above.

While the invention has been illustrated and described as embodied in a method of precision measurements of sizes and line width roughness of small objects in accordance with their images obtained in scanning electron microscope, it is not intended to be limited to the details shown, since various modifications and structural changes may be made without departing in any way from the spirit of the present invention.

The invention claimed is:

1. A method of measurement of microsizes of relief objects in scanning electron microscope with use of analytical models, comprising the steps of:
   1.1 storing an SEM image of a measurement object on a physical carrier or a memory of a computer in digital form for subsequent processing;
   1.2 selecting from the stored image which represents a dependency of a value of a video signal S from coordinates x and y in a field of vision of the microscope-S(s, y), a signal line representing a dependency of the video signal S from the coordinate S with a constant value of Y-S(x) which is an experimental video signal $S_E(X)$;
   1.3 determining a number of parameters of an analytical model which represents a system of equations, substantially fully characterizing a geometry of the relief object, its composition and characteristic of the measuring SEM;
   1.4 assigning to each of the parameters a credible numerical value selected with consideration of a preliminary information about an object and the microscope;
   1.5 with the use of said equations of analytical model and an additional approximation, calculating a model video signal of an initial approximation S(°), which imitates the experimental video signal $S_E(X)$;
   1.6 with the calculated video signal S(°) bringing the calculated video signal X(°) comparing it with the scale experimental video signal $S_{(E)}X$ by scaling and selection of a background level so as to obtain a normalized video signal;
   1.7 comparing the normalized video signal with the experimental video signal in
   1.8 introducing into initial numerical value of a size Lo a disturbance 6LO so that a new value of the size L1 is equal to $L_1 = L_0 + \delta L_0$, with the new value $L_1 L_0 + \delta L_0$;
   1.9 selecting a first perturbed model video signal $S^{(1)}(x)$ and comparing with experimental video signal as per 1.6 and also comparing it with experimental video signal $S_E(X)$ in accordance with 1.7;
   1.10 if the video signal $S^{(1)}(x)$ better corresponds to the experimental video signal $S_E(X)$ than $S_{(o)}(X)$ obtained in 1.7 then selecting a new perturbance of the size 6L~ with the same sign as 6Lo, and Otherwise selecting a sign 6L1 opposite to the sign $\delta L_0$;
   1.11 introducing into the value $L_1$ a new disturbance $\delta L_1$ with consideration of said signs in 1.10 and repeating the steps 1.8-1.10;
   1.12 varying the value L, selecting a value which provides a best approximation model-signal to the experimental video signal so that said value of the model object is an actual model of a physical object measured in correspondence with the direction x SEM image;
   1.13 repeating the steps 1.1-1.12 for all other lines of the stored SEM image so as to obtain information which allows to make a judgment about changes of sizes of objects along a direction y, and also about its shape and details of a parameter and also allowing to determine an average value of a size of an object and its dispersion which statistically characterizes a non-homogeneity of the width of the object or a line width roughness.

2. A method as defined in claim 1, wherein the parameters of 1.3 are selected from the group consisting of a size of the object on a plane L, a height of a width H angles of sizes of side walls, coefficient of secondary electronic emmission of a material of an element and a field which surrounds it for hetrogenic objects, and a resolution of the microscope.

3. A method as defined in claim 1, wherein a quantitative criterion of the correspondence of 1.7 is selected to be a criterion selected from the group consisting of a coefficient of correlation, a factor of non-correspondence R and another numerical indicator.

4. A method as defined in claim 1, wherein a value of perturbance in 1.8 is selected small which does not exceed 5-10% of $L_0$.

5. A method as defined in claim 1; and further comprising clarification of the initial approximation in 1.4-1.12 with a use of method of least squares.

6. A method as defined in claim 5; and further comprising clarification of the initial approximation with a method of least squares in two steps including a first step for clarifying parameters which determine a shape of the maximums of the video signal, and a second step including clarification of the size object in conditions when a shape of the maximum of a model video signal corresponds the most to the shape of the maximums of the experimental video signal.

* * * * *